Sept. 16, 1958  K. ZWICK ET AL  2,851,910
COORDINATE TABLE FOR MACHINE TOOLS
Filed Sept. 9, 1953  3 Sheets-Sheet 1
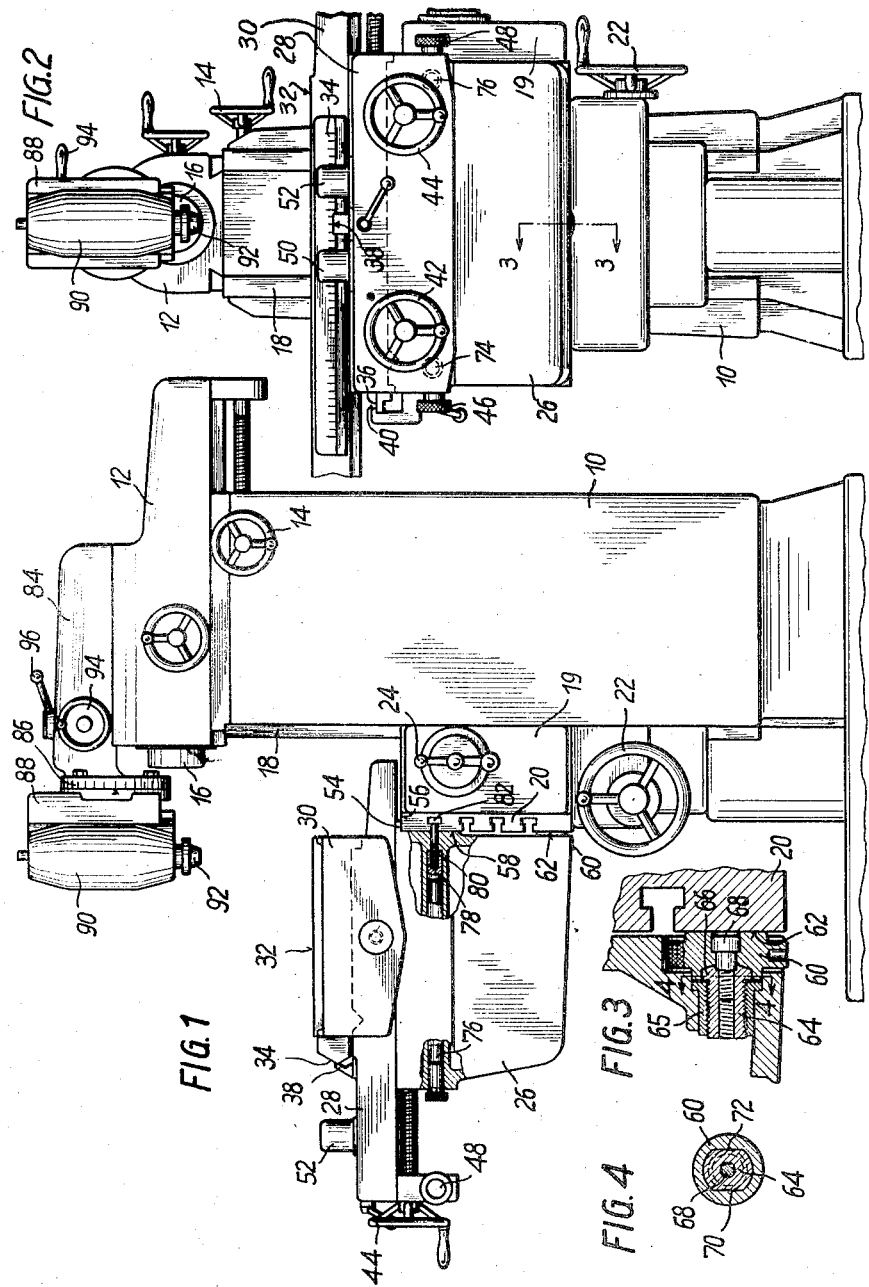
INVENTORS
Kurt Zwick
Hans Müller
BY Charles Shepard
ATTORNEY

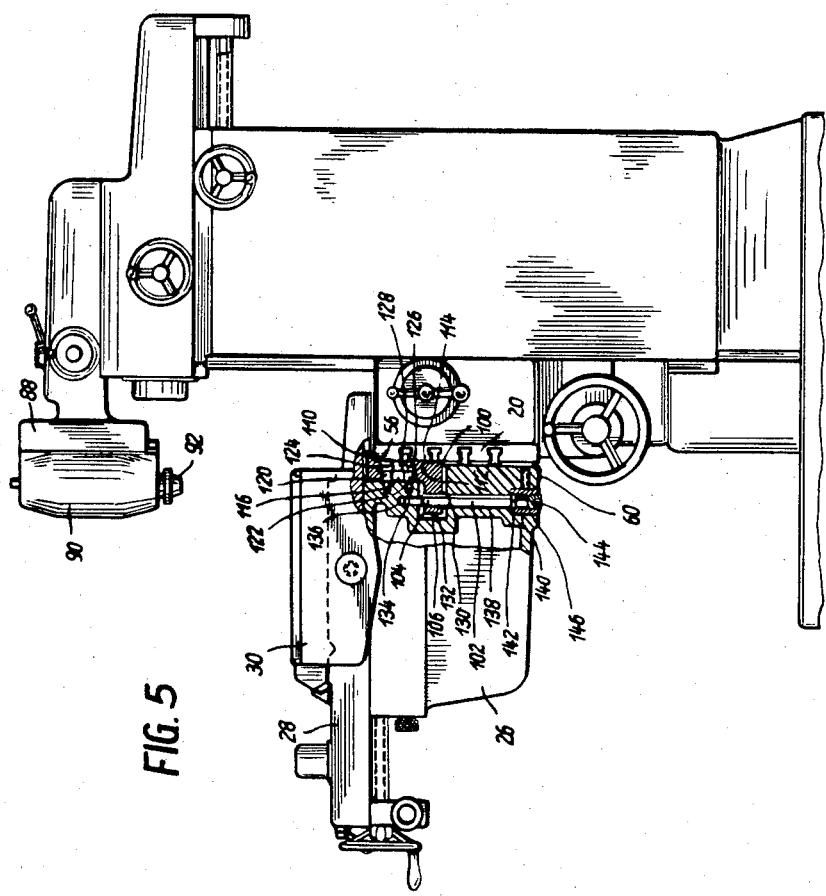

Sept. 16, 1958  K. ZWICK ET AL  2,851,910
COORDINATE TABLE FOR MACHINE TOOLS
Filed Sept. 9, 1953  3 Sheets-Sheet 3

United States Patent Office 2,851,910
Patented Sept. 16, 1958

2,851,910

COORDINATE TABLE FOR MACHINE TOOLS

Kurt Zwick and Hans Müller, Munich, Germany, assignors to Hans Deckel, Munich-Solln, and Friedrich Wilhelm Deckel, Garatshausen, Post Tutzing, Germany Application September 9, 1953, Serial No. 379,177

Claims priority, application Germany September 15, 1952

9 Claims. (Cl. 77—4)

The present invention relates to a coordinate table for attachment to machine tools such as milling machines adapted to be used for jig boring.

An object of the invention is the provision of a generally improved and more satisfactory coordinate table.

Another object is the provision of a coordinate table so designed so that it may be easily and quickly adjusted to precisely the correct position on the machine on which it is mounted.

Another object is the provision of a coordinate table which may be removed from the machine tool with which it is normally used, and which is self-contained so that it may be used by itself when it is removed from the machine tool.

A further object is the provision of a coordinate table so designed and constructed that the plane of the table may be precisely adjusted in two directions, with respect to the axis of the boring tool holder or spindle, so that it is not necessary to use the table on a boring machine having a swingable boring tool holder, but it may be used satisfactorily on a machine in which the boring tool holder is stationary or non-adjustable.

These and other desirable objects may be attained in the manner disclosed as an illustrative embodiment of the invention in the following description and in the accompanying drawings forming a part hereof, in which:

Fig. 1 is a side elevational view of a milling machine equipped with a coordinate table in accordance with one embodiment of the present invention, with parts broken away and parts in vertical section;

Fig. 2 is a front elevational view of the same;

Fig. 3 is a fragmentary vertical section taken approximately on the line 3—3 of Fig. 2, showing a detail of an adjusting device;

Fig. 4 is a section taken approximately on the line 4—4 of Fig. 3;

Fig. 5 is a view similar to Fig. 1 showing a second embodiment of the invention;

Fig. 6 is a rear elevational view of the table of Fig. 5, detached from the machine;

The same reference numerals throughout the several views indicate the same parts.

Figure 8:
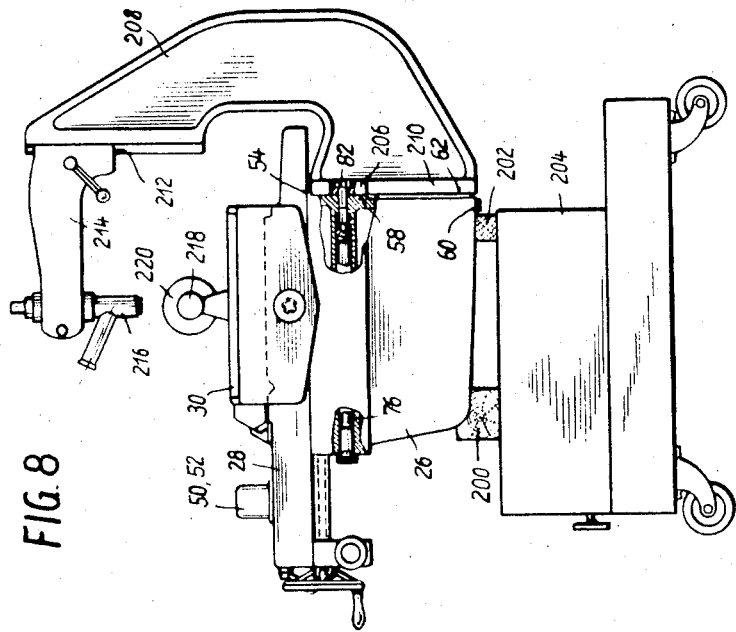
Fig. 8 is an end elevational view of the construction shown in Fig. 7, with parts broken away and parts in vertical section.

Referring first to Figs. 1 and 2, there is shown a typical machine tool of the kind with which the present coordinate table may be used, such for example as a milling machine having a column 10 in which the driving mechanism and control means are arranged. At the top of the column 10 there is a milling spindle housing or socket 12, movable horizontally on suitable dovetail guideways as shown, in a front and back direction, by turning the hand wheel 14 which is operatively connected to a horizontal feed screw. A suitable milling spindle, the forward end of which is shown diagrammatically at 16, is supported horizontally within the housing 12 and is driven by the usual drive mechanism arranged within the column 10.

The front face of the column 10 carries vertical guides 18 on which a vertical slide 19 moves upwardly and downwardly, its vertical movement being effected by the handwheel 22. On the front face of the slide 19 there is a vertical worktable 20 movable horizontally from side to side, such movements being effected by the handwheel or crank 24.

According to the present invention, a coordinate table is removably fastened to the vertical worktable 20 and is arranged to carry the work for certain machining operations such as when jig boring is to be performed, the coordinate table also being arranged for independent use as a measuring instrument when it is removed from the milling machine and placed on a separate support of simple and inexpensive construction. The coordinate table is developed as a self-contained unit which is adapted to be accurately adjusted in coordinate directions and is provided with measuring means for precisely indicating the position to which the coordinate table is adjusted, as will be apparent.

In the first embodiment of the coordinate table of the present invention, it comprises a base which may be termed a knee portion 26, on which is mounted the compound slide having the parts 28 and 30. The slide 28 moves horizontally in a forward and rearward direction on the top of the knee 26 (guided in suitable guideways, of course) while the upper slide 30 moves horizontally in a transverse or lateral direction on the top of the slide 28. The top of this upper slide 30 is provided with a work-holding surface 32 on which the work is suitably clamped or otherwise secured. The slides 28 and 30 respectively carry graduated rules or scales 34 and 36 extending along the respective directions in which these slides move, and which read in conjunction with index graduations or reading marks 38 and 40, respectively, to obtain a rough setting of the slides by means of the hand wheels 42 and 44 which respectively control the horizontal adjusting movements of the slides 28 and 30. The fine setting or fine adjustment of the slides 28 and 30 is effected by the fine adjustment knobs 46 and 48, respectively, on the basis of precision graduated rules or scales and index marks on the respective slides, which can be read by the operator in enlarged or magnified condition by suitable optical magnifying means such as the microscopic eyepieces 50 and 52.

The fastening of the coordinate table 26, 28, 30 to the worktable 20 of the machine is effected in a manner which permits extremely fine adjustment of the coordinate table to a precise position of orientation. At the upper rear edge of the knee 26 there is a lip or flange 54 extending horizontally and forming a supporting member which rests upon the upper forward edge 56 of the work table 20. This determines the elevation of the coordinate table with respect to the vertical work table 20. A narrow vertical area 58 of the knee 26 rests against the front face of the work table 20 along a horizontal band near the upper edge of the vertical table, thus determining the horizontal position of the knee relative to the vertical table 20. The upper part of the knee is clamped to the work table so that it will not pull away from the table, by means including a clamping member 80 described in further detail below.

In order to determine the precise angular adjustment of the base or knee 26 and consequently of the entire coordinate table, in a front to rear direction, relative to the vertical work table 20, adjusting means is provided in the form of an adjusting screw 60 mounted in the knee 26 near the center of the lower edge thereof, having a flat head surface 62 facing rearwardly to bear against the flat front surface of the vertical table 20 near its lower edge. A threaded shank 64 of the adjusting screw mechanism is threaded into a threaded bushing 65 set in a suitable opening in the knee 26. Preferably the threaded shank 64 and the main head portion 60 of the adjusting screw are made in two separate parts, the right hand end 66 of the threaded shank (when viewed as in Fig. 3) resting in a slightly spherical indentation in the left hand face of the head portion 60 of the screw, so that the portion 60 may assume slightly oblique positions relative to the shank 64. The two parts are held together by a countersunk screw 68 extending through the head portion 60 and into the threaded shank 64, as seen in Fig. 3. In order that rotary adjusting movements of the head portion 60 may be transmitted to the threaded shank 64, the socket joint or connection between these two parts is formed with a noncircular outline, having for example the two flat surfaces 70 and 72 as seen in Fig. 4.

The lower edge of the head portion 60 projects slightly below the bottom surface of the knee 26, as shown, so as to be accessible for adjustment, and the periphery of the head portion 60 is provided with a series of radial holes into which a spanner wrench may be inserted for turning the head 60 and (through the flat surfaces 70 and 72) the threaded shank 64, thus advancing or retracting the adjusting screw in order to have the flat bearing surface 62 thereof project more or less from the rear face of the knee 26, thus swinging the entire knee angularly to a slight extent, about an axis of rotation or hinge axis formed by engagement of the parts 54 and 56 with each other.

For holding the upper edge of the coordinate table tight against the upper front face of the vertical work table 20, and for tightening the coordinate table firmly against the work table, there is provided a pair of clamping screws 74 and 76 (see Fig. 2) each having a front end accessible at the upper front part of the knee 26 (see Fig. 1) and extending rearwardly through the knee. An axially threaded bore 78 at the rear end of each of these screws receives the forward threaded end of a T-head bolt 80, the head 82 of which is seated in a T-slot in the front face of the table 20.

The coordinate table may be used, of course, to hold work to be operated upon by a cutting tool mounted on the milling cutter spindle 16. However, the coordinate table is particularly designed and mainly useful for holding work to be operated upon by a boring tool, when performing jig boring operations. For this purpose, the machine may be provided with a boring tool holder comprising a housing 84 placed on top of the milling spindle socket or holder portion 12, the housing 84 projecting forwardly beyond the front of the portion 12 and being provided with a circular flange 86 lying in a vertical plane extending transversely of the machine. Mounted on this flange 86, for rotary adjusting movement thereon, is the vertical guide 88 on which slides upwardly and downwardly the adjustable boring tool holder 90, containing a vertical boring spindle 92 driven from the milling spindle 16 through suitable intermediate drive members of conventional construction contained within the boring tool holder head parts 84 to 90. The feeding advance of the boring tool holder 90 and its spindle 92 can be effected either by a hand wheel 94, or, when the shift lever 96 has been properly set for that purpose, by automatic spindle feeding means of known form.

It will now be seen that provision has been made for exact and precise adjustment of the angularity of the top surface of the coordinate table, relative to the axis of the boring spindle 92. In the horizontal longitudinal direction (that is, the direction in which the lower slide 28 moves on the knee 26) the angularity of the work supporting surface relative to the tool spindle is determined by turning the adjusting screw 60 to tilt the knee 26 slightly on the horizontal hinge ends or adjusting axis formed by the engagement of the supporting lip 54 on the supporting surface 56. In the horizontal transverse direction (that is, the direction in which the slide 30 moves on the slide 28) the adjustment is performed by swinging the boring tool holder parts 88, 90 around their horizontal axis on the circular flange 86, then clamping the parts together by the clamping bolts whose heads are shown just to the right of the circular flange 86 in Fig. 1. The flange 86 preferably has angular scale graduations cooperating with an index mark or pointer on the part 88, as seen in Fig. 1.

It should be mentioned that the accuracy of setting and working, in accordance with this invention, is not dependent on the accuracy of the milling machine itself. As a result of heavy loads or long continued use, the accuracy of the milling machine may decrease as the cooperating surfaces of vertical guides 18 and the table 20 become worn or sprung. But when using the present invention, the work table 20 is set at a suitable elevation on the guides 18 and is then clamped firmly in place by suitable clamping bolts, and does not move further on the guides 18 during the use of the coordinate table of the present invention. Therefore, the accuracy of angular relationship between the coordinate table and the boring spindle 92 is not dependent in any way upon the accuracy of the main guides 18 of the milling machine. Thus the work table 20 of the machine serves, for the time being, merely as a fixed or stationary support for the self-contained coordinate table which is itself provided with all necessary means for accurate angular adjustment in one direction, while accurate angular adjustment in another direction is provided by the adjustability of the special boring head on the circular flange 86.

Referring now to a second embodiment of the invention illustrated in Figs. 5 and 6 of the drawings, this is in general similar to the first embodiment above described. However in the second embodiment, instead of a supporting lip 54 resting on the upper front edge of the work table 20 throughout the entire length of the work table, the supporting surface on the coordinate table knee 26 is here shortened to a relatively short supporting portion 54a at one side of the base or knee 26. At the other side of the knee 26, support is provided by a supporting member or element 100 adjustable vertically on the knee 26 and having a rearwardly extending lip or flange 110 which extends over and rests upon the upper edge of the work table 20 at the opposite end thereof from that which is engaged by the fixed lip 54a of the knee. Below the supporting lip 110, the rear face 112 of the supporting member 100 engages the front face 114 of the work table 20, while the supporting member 100 itself is set into and movable vertically in a machined vertical groove in the rear face of the knee 26. For holding the parts together, a vertical longitudinal slot 116 is provided in the supporting member 100, and guide pins or slide pins extend through this slot and are threaded into the knee 26, these pins having cylindrical portions 120 and 122 extending snugly through the slot 116, and having cap screw heads 124 and 126 which lie in a countersunk or wider part 128 on the groove 116 and bear against the supporting member 100 to keep it snugly but slidably seated against the knee 26.

A flange or projection 130 formed integrally at the bottom of the supporting member 100 extends into a recess 132 of the knee 26 and has a vertical bore provided with a female thread 106 for receiving the male threaded portion 104 of an adjusting bolt 102. At the upper end of this adjusting bolt is a cylindrical guide pin portion 134 guided in a bore 136 of the knee, while the intermediate portion of the bolt 102, below the threads 104, is guided in a bore 138 of the knee. At the bottom, this bore is widened at 140 to receive the enlarged supporting flange 142 of the bolt 102, while the adjusting head 144 of the bolt is supported in a bushing 146.

The lower end of the bolt 102 is accessible at the bottom of the knee 26. By turning the head 144 of the bolt, the screw threads 104 cause the entire supporting member 100 to move upwardly or downwardly, relative to the knee, thus raising or lowering the end of the knee at which the bolt 102 is located, relative to the vertical work table 20. To avoid undesirable edge effects and consequent concentrated pressure, the fixed supporting surface 54a and the adjustable supporting surface 110 are preferably made slightly convex.

This embodiment of the invention has the same adjusting screw 60 as in the embodiment previously described, for adjusting the coordinate table angularly in the vertical plane in which the horizontal slide 28 moves. By means of the adjusting bolt 102, it is seen that the coordinate table can also be adjusted to a slight extent angularly in the other vertical plane in which the slide 30 moves. Therefore it is unnecessary to provide for the angular adjustability of the boring spindle 92 as was done in the first embodiment, and the circular flange 86 of the first embodiment can be eliminated, thus simplifying the machine in the manner shown in Fig. 5, in which the vertical guide 88 of the boring head is in permanently fixed relation to the housing 84 instead of being angularly adjustable on a circular flange.

Figure 7:
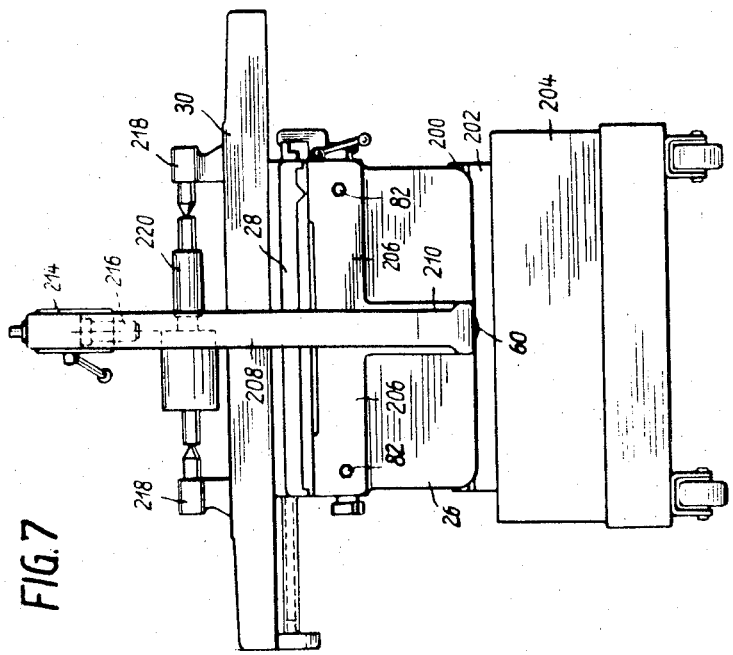
Fig. 7 is an elevational view of the table detached from the machine and mounted on a separate support and used as a measuring instrument.

According to another aspect of this invention, the coordinate table when removed from the milling machine may be used for other purposes, forming for example a self contained precision measuring device. This is shown in Figs. 7 and 8 of the drawings, to which reference is now made. The knee 26 of the coordinate table is placed on suitable supporting strips 200 and 202 on a small truck 204, and being held in place merely by its own weight, without any special fastening means.

The same fastening screws 76, 82, which were previously used to draw the upper part of the knee firmly against the upper front face of the work table 20, are now used to hold a foot 206 of a supporting arm 208 firmly against the upper rear face of the knee 26, in the same position which would otherwise be occupied by the upper front part of the work table 20. Midway of its length, the foot 206 of the supporting arm has a downward extension 210 as seen in Fig. 7, to overlie the adjusting screw 60, 62, so that the angularity of the entire supporting arm or bracket 208 about the horizontal edge of the part 206 may be adjusted by turning the screw 60.

The supporting arm or bracket 208 is extended upwardly above the coordinate table and is there provided with a vertical guide 212, on which a bracket arm 214 is adjustable, which bracket arm supports a microscope 216.

On the upper slide 30 of the coordinate table there are fastened two tailstock stands 218 between which the article to be tested or measured is placed; for instance, a cylindrical shaft 220 having a number of offsets.

By moving the slides 28 and 30 of the coordinate table in desired directions, individual measuring points on the shaft 220 can be brought in line with the optical axis of the microscope 216, and the distance between these measuring points can be determined on the basis of the above mentioned fine or precise scales of the coordinate table, read through the eye pieces 50 and 52 already mentioned.

It is also possible, if desired, to replace the microscope 216 in the holder 214 by a scribing tool, a center-marking device, or other desired tool or implement to be used in measuring, marking, or testing the work piece 220 mounted on the coordinate table.

In this way it is seen that the coordinate table, due to its self-contained nature, is capable of efficient and beneficial use both when attached to the milling machine for which it is primarily intended, and when removed therefrom. Thus the operating efficiency of the milling machine is greatly increased, for the milling machine may be used for ordinary milling operations (without the coordinate table) while at the same time accurate measurements may be made with the coordinate table removed from the milling machine, without tying up the milling machine and interfering with its normal use when it is desired merely to make measurements or tests on a work piece. But when accurate boring is to be performed, the coordinate table is easily and quickly applied to the milling machine, and may be adjusted very precisely so as to bring the axis of the boring spindle 92 exactly perpendicular to the work supporting surface of the table 30 of this mechanism, notwithstanding worn parts or inaccuracies in the guideway 18 and main table 20 of the milling machine.

Of course the parts 206—216 may be used with either of the two forms of work table previously described. If used in connection with the second form (Figs. 5–6) the same features of adjustability which enable accurate orientation of the coordinate table relative to the boring spindle axis, will also enable accurate orientation of the guideway 212 relative to the coordinate table, to bring the microscope axis into truly perpendicular relation to the planes of movement of the slides 28 and 30.

It will be seen from the foregoing disclosure that the above-mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A coordinate table adapted for attachment to a work table of a milling machine for performing jig boring operations and the like, the work table to which it is attached having a substantially horizontal supporting surface and a substantially vertical face, said coordinate table having a base to be applied substantially against said vertical face, a supporting lip carried by said base for resting on said horizontal surface of said work table, tension screw mechanism near the upper part of said base for pulling the upper part of said base tightly against the upper part of said work table, compression screw mechanism mounted on said base near the lower part thereof for bearing against the lower part of said vertical face of said work table to hold the lower part of said base at a variable distance from the lower part of said vertical face, a first slide mounted on said base for substantially horizontal movement thereon in one direction, and a second slide adapted for supporting work to be operated upon and mounted for substantially horizontal movement on said first slide in a direction substantially perpendicular to the direction of movement of said first slide.

2. A construction as defined in claim 1, in which said supporting lip is in two parts engaging said horizontal surface of said work table at two points spaced from each other, further including screw means for adjusting the elevation of one of said parts relative to said base, thereby to vary the orientation of said base relative to said work table about an axis substantially perpendicular to said vertical face of said work table.

3. A construction as defined in claim 2, in which the surfaces of said lip parts which engage said horizontal surface of said work table are convex in a direction along said horizontal surface.

4. A construction as defined in claim 1, in which said compression screw mechanism includes a shank part screw threaded into said base, and a separate head part bearing against said shank part and against said vertical face of said work table.

5. A construction as defined in claim 4, in which the two parts of said compression screw mechanism have approximately spherical complementary surfaces mating with each other to transmit pressure from one to the other.

6. A construction as defined in claim 4, in which said head part is accessible for turning for adjustment purposes, and in which there is a connection of non-circular outline between said head part and said shank part, so formed that turning movements of said head part are transmitted to said shank part.

7. A supplementary work table structure for attachment to a machine tool equipped with a tool spindle and with a normally movable main work table having an approximately horizontal top face and an approximately vertical front face meeting each other at a corner which is horizontally elongated, said supplementary table structure comprising a base section having a rear face to be applied to and hang in front of said front face of said main table, a first slide movable approximately horizontally on said base section, and a work holding slide movable approximately horizontally on said first slide in a direction substantially at right angles to the direction of movement of said first slide, said base section having near two opposite ends thereof two lugs spaced from each other for overlying the top face of the main work table to which said base section is attached, to determine the height of opposite ends of said base section with respect to the height of said work table, screw means for adjusting one of said lugs vertically with respect to said base section to enable tilting adjustment of said base section in a plane parallel to the vertical front face of the main work table to which said base section is attached, a rearwardly faced abutment near the bottom of said rear face of said base section for engaging the front face of the main work table to which said base section is attached, to space the bottom part of the rear face of said base section from the bottom part of the front face of said main work table, and screw means for adjusting said abutment relative to said base section in a direction approximately perpendicular to said rear face of said base section, to enable tilting adjustment of said base section in a plane perpendicular to said rear face of said base section and said front face of the main work table to which said supplementary structure is attached, the two tilting adjustments of said base section enabling the directions of movement of said first slide and said work holding slide to be accurately oriented with respect to the tool spindle of the machine tool to which said supplementary structure is attached, notwithstanding inaccurate orientation of the main work table with respect to the tool spindle, and the movements of said first slide and said work holding slide enabling the work to be moved in coordinate directions relative to the tool spindle while the main work table remains stationary in clamped position, thereby eliminating the effect of any inaccuracies in the guideways on which the main work table normally moves.

8. A construction as defined in claim 7, in which the direction of movement of one of said slides is substantially parallel to one of said planes of tilting adjustment and the direction of movement of the other of said slides is substantially parallel to the other of said planes of tilting adjustment.

9. A construction as defined in claim 7, in which said supplementary table structure comprises fine adjustment means including a microscopic eyepiece for making fine adjustment of the position of said first slide with respect to said base section, and other fine adjustment means including another microscopic eyepiece for making fine adjustment of the position of said work holding slide with respect to said first slide.

References Cited in the file of this patent
UNITED STATES PATENTS

| 305,922 | Hendey | Sept. 30, 1884 |
| 367,782 | Brown | Aug. 9, 1887 |
| 728,368 | Chambliss | May 19, 1903 |
| 752,714 | Smith | Feb. 23, 1904 |
| 989,893 | Brick | Apr. 18, 1911 |
| 1,753,143 | Zimmerman | Apr. 1, 1930 |
| 1,775,952 | Turrettini | Sept. 16, 1930 |
| 2,110,958 | Lindner | Mar. 15, 1938 |
| 2,146,906 | Moller | Feb. 14, 1939 |
| 2,181,128 | Hack | Nov. 28, 1939 |
| 2,387,440 | Guellich et al. | Oct. 23, 1945 |

FOREIGN PATENTS

| 428,723 | France | June 28, 1911 |
| 507,813 | Great Britain | June 21, 1939 |
| 917,346 | France | Sept. 9, 1946 |